United States Patent
Makaran et al.

(10) Patent No.: US 6,809,484 B2
(45) Date of Patent: Oct. 26, 2004

(54) MULTIPLE ELECTRONICALLY COMMUTATED MOTOR CONTROL APPARATUS AND METHOD

(75) Inventors: John E. Makaran, London (CA); Dragan Radakiovic, London (CA)

(73) Assignee: Siemens VDO Automotive Inc., Mississauga (CA)

( * ) Notice: Subject to any disclaimer, the term of this patent is extended or adjusted under 35 U.S.C. 154(b) by 0 days.

(21) Appl. No.: 10/256,219

(22) Filed: Sep. 25, 2002

(65) Prior Publication Data

US 2003/0094913 A1 May 22, 2003

Related U.S. Application Data

(60) Provisional application No. 60/324,779, filed on Sep. 25, 2001, and provisional application No. 60/325,153, filed on Sep. 25, 2001.

(51) Int. Cl.[7] .................................................. H02P 7/80
(52) U.S. Cl. ............................ 318/34; 318/47; 318/67; 318/254; 62/228.1; 62/228.4
(58) Field of Search ............................ 318/34, 47, 66, 318/67, 68, 254, 138, 439; 62/228.1, 228.4

(56) References Cited

U.S. PATENT DOCUMENTS

| | | | | |
|---|---|---|---|---|
| 4,392,099 A | * | 7/1983 | Kuniyoshi | 318/797 |
| 5,079,488 A | * | 1/1992 | Harms et al. | 318/471 |
| 5,473,225 A | * | 12/1995 | Miyazaki | 318/52 |
| 5,528,114 A | * | 6/1996 | Tokizaki et al. | 318/67 |
| 5,712,540 A | * | 1/1998 | Toda et al. | 318/46 |
| 5,973,463 A | * | 10/1999 | Okuda et al. | 318/430 |
| 6,463,891 B2 | * | 10/2002 | Algrain et al. | 123/41.12 |
| 6,486,632 B2 | * | 11/2002 | Okushima et al. | 318/599 |
| 6,624,601 B2 | * | 9/2003 | Arimitsu et al. | 318/34 |

* cited by examiner

Primary Examiner—Rina Duda

(57) ABSTRACT

A cooling system includes multiple cooling fans, each driven by a corresponding fan motor controller. Each fan motor controller includes electronic commutation circuitry that is responsive to a modulated signal to control the speed of the associated motor and fan. The controller for one motor includes a microcontroller that receives a single control signal from an external control unit and translates that control signal into the modulated signals provided to all of the other motor controllers. In one embodiment, the microcontroller can adjust the duty cycle of the modulated control signals, and can stagger the on-off times of the signals to minimize conducted RFI emissions.

15 Claims, 2 Drawing Sheets

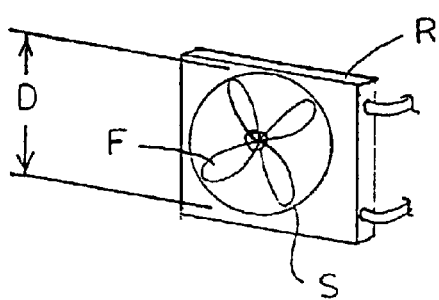
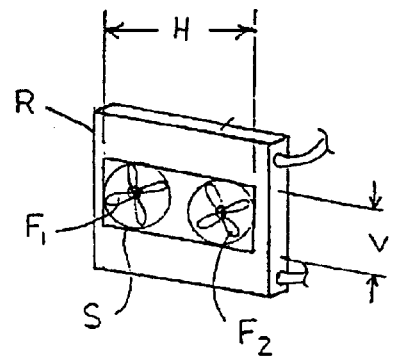
FIG. 1
FIG. 2
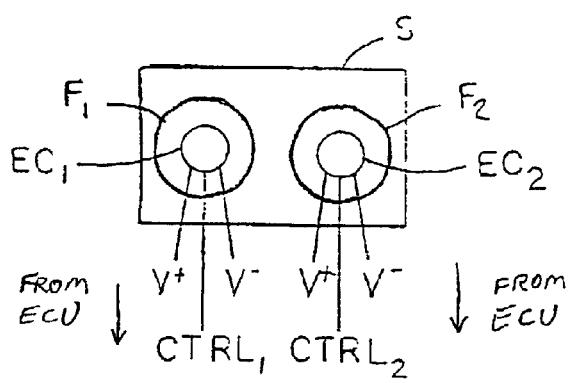
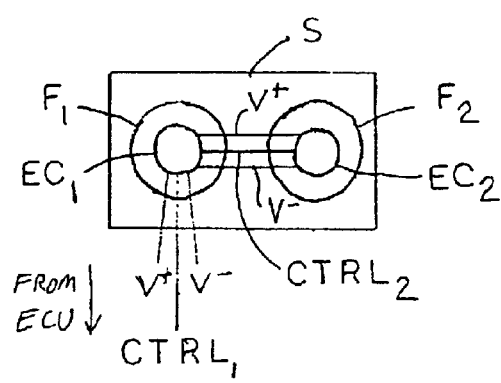
FIG. 3
(PRIOR ART)
FIG. 4

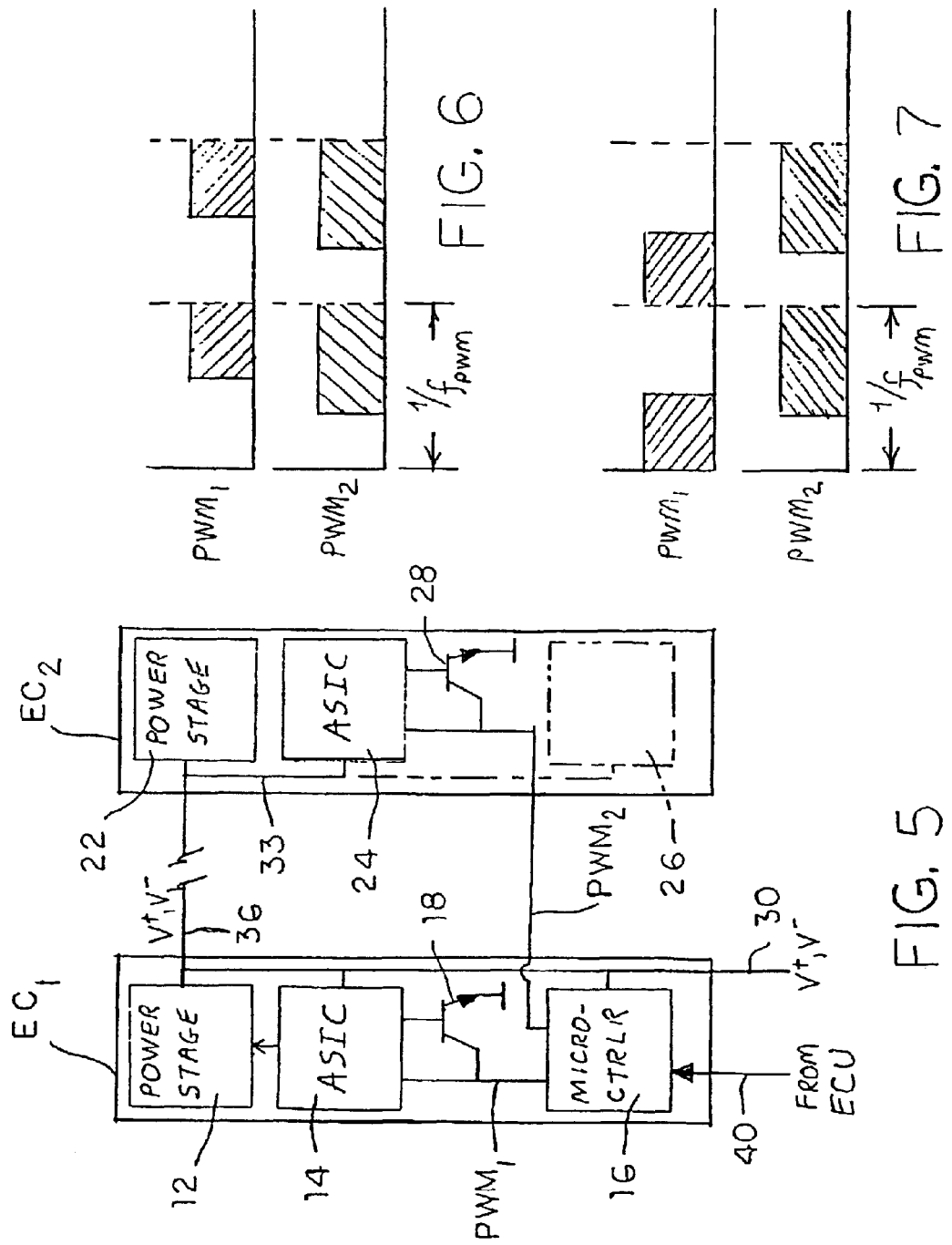

MULTIPLE ELECTRONICALLY COMMUTATED MOTOR CONTROL APPARATUS AND METHOD

REFERENCE TO RELATED APPLICATIONS

This application claims priority to U.S. provisional application Ser. Nos. 60/324,779 and 60/325,153, filed on Sep. 25, 2001, having the same title and inventor as the present application. The disclosure of this provisional application No. 60/324,779 is incorporated herein by reference.

BACKGROUND OF THE INVENTION

The present invention relates generally to motor circuits, and more particularly, to motor circuits that involve multiple electronically commutated motors.

Convection air cooling is widely used in many industries, including the automotive industry. In automobiles, for example, heat from the internal combustion engine is transferred via coolant fluid to a radiator element, such as the radiator R shown in FIG. 1. The radiator element then employs air cooling to dissipate the heat from the heated coolant fluid. In a typical installation, a cooling fan F is supported within a shroud S to direct air flow across the radiator R.

In any event, the quantity of heat transferred by air cooling is related to the size of the fan, as well as other factors, including fan speed and blade shape. However, fan size is often limited by the environment in which the fan is used. For example, the fan size in an automobile is limited by the amount of available space in the engine compartment of the automobile. Because fans rotate, any increase in fan size requires additional space in every radial direction. In other words, a rotary fan, and especially its supporting shroud S, occupies a diameter D. Greater air flow requirements translate to a larger fan, which means a larger diameter D which, again, increases the profile of the fan in every radial direction.

One way to increase the effective cooling without requiring additional space in every radial direction is to employ multiple fans. For example, employing two identical, adjacent fans, such as the arrangement depicted in FIG. 2, increases air flow while only requiring additional space in one direction. As a result, two smaller fans, such as fans $F_1$ and $F_2$, may fit more conveniently than one large fan in an application that has excess room in the horizontal direction H but little or no excess room in the vertical direction V. A common shroud S can be provided to house both fans, while maintaining a compact profile.

Automotive cooling system applications particularly benefit from a multiple fan arrangement, such as the arrangement shown in FIG. 2. In many automotive designs, the use of two adjacent fans is more easily accommodated than a single large fan, especially for smaller vehicles. In one prior art automotive fan system, two electrically commutated ("EC") motors, designated as $EC_1$ and $EC_2$ in FIG. 3, are employed to rotate the respective fans $F_1$ and $F_2$. Associated with each motor $EC_1$ and $EC_2$ in such a system is a driver circuit that includes one or more drive switches, a snubber, and other elements typically associated with EC motors.

One drawback to the above system involves the necessity of various wiring elements and harnesses to deliver the DC power to the driver circuits and motors, as well as control information to the driver circuits. In particular, EC motors typically require signals that turn the various driver circuit switches on and off at appropriate times during the rotation of the motor. Such control signals may be used to control the speed of the motors. In general, the source of the control signals is the engine control unit (ECU) of the automobile, and the source of DC power is the vehicle battery.

Accordingly, multiple wires must be run to each of the two EC motors to allow control thereof. As shown in FIG. 3, each motor and associated control system $EC_1$ and $EC_2$ requires its own set of power supply lines $V^+$ and $V^-$ and its own control signal wire $CTRL_1$ and $CTRL_2$. Thus, a separate wiring harness is required for each EC motor. Of course, the duplicate wiring harnesses increase the component requirements for the cooling system, and increases the number of components that can wear out. Perhaps more problematic is the need to route the wiring harnesses through the engine compartment, and the increased avenues for introducing RF interference into the motor control system. Naturally, these problems increases for each motor added to the cooling system.

Accordingly, there is a need for a multiple motor system that avoids these shortcomings and that is particularly suited for use as part of an engine cooling system. Such need exists particularly in the automotive field for use of the dual motors for cooling fan purposes.

SUMMARY OF THE INVENTION

The present invention addresses the above need, as well as others, by providing a motor circuit and associated method that employs multiple EC (electronically commutated) motors that are controlled via a single controller located on the shroud on or near where the motors are mounted. The use of a single controller reduces the amount of wires that must be run from a control signal generator and/or DC power supply to the motors.

In one embodiment of the present invention, a motor circuit includes a first EC motor circuit, a second EC motor circuit, and a controller. Each of the first and second EC motor circuits includes a switch, a commutation and protection circuit, and a power stage that are operable to power The controller provides PWM signals to each switch of the first and second EC motor circuits. The first and second motor circuits thereafter generate a motor speed responsive to a duty cycle of the PWM signals provided by the controller.

Preferably, the first and second motor circuits include motors to drive first and second fans mounted within a fan shroud, and the controller is affixed to the shroud and/or the motor of the first motor circuit. A single wiring harness provides a speed command to the controller from an external source, as well as power cables for the motors.

In another embodiment, a motor circuit includes a first EC motor circuit, a second EC motor circuit, and a controller. Each of the first and second EC motor circuits includes a switch, a commutation and protection circuit, and a power stage. The controller provides PWM signals to each switch of the first and second EC motor circuits. The first and second motor circuits thereafter generate a motor speed responsive to a duty cycle of the PWM signals provided by the controller. The controller is operable to generate the PWM signals such that the start and stop times of the positive duty cycles of the PWM signals are staggered.

Thus, embodiments of the present invention reduce the wiring requirements within a shroud supported dual motor set by employing a single speed PWM signal generating controller. Other embodiments reduce electromagnetic interference by staggering the start and stop times of the PWM signals to two fans.

The above described features and advantages, as well as others, will become more readily apparent to those of ordinary skill in the art by reference to the following detailed description and accompanying drawings, which are embedded therein.

DESCRIPTION OF THE FIGURES

FIG. 1 is a perspective representation of a single fan cooling system for a vehicle.

FIG. 2 is a perspective view of a dual fan cooling system for a vehicle.

FIG. 3 is a representation of a prior art dual motor control system.

FIG. 4 is a representation of a dual motor control system in accordance with one embodiment of the present invention.

FIG. 5 is a plan view of the control circuits for the dual motor control system shown in FIG. 4

FIG. 6 is a graph of a duty cycle for controlling the dual motors in the system shown in FIG. 4, in accordance with one embodiment of the invention.

FIG. 7 is a graph of a duty cycle for controlling the dual motors in the system shown in FIG. 4, in accordance with another embodiment of the invention

DESCRIPTION OF THE PREFERRED EMBODIMENTS

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

As shown in FIG. 2, the cooling system of a vehicle can include a radiator R and a system of fans $F_1$ and $F_2$ mounted with a common shroud S. As is well-known, the fans direct a flow of air across the radiator R to reduce the temperature of coolant flowing through the radiator. For space considerations, and for the purpose of producing an optimum airflow rate and volume across the radiator, the system includes two fans, although more fans can be added as needed.

While the two fans $F_1$ and $F_2$ can include their own wiring harness, as shown in the prior art system of FIG. 3, the present invention contemplates an improved system for controlling the multiple motors. In particular, as shown in FIG. 4, a single wiring harness communicates between the engine control unit (ECU) and the electronic control circuit $EC_1$ of only one motor and associated fan $F_1$. This single wiring harness includes the motor control signal wire $CTRL_1$ and the positive and negative power supply wires $V^+$ and $V^-$.

Control and power is provided to the second motor control circuit $EC_2$ and associated fan $F_2$ by a much reduced wiring harness spanning from the first control circuit $EC_1$ to the second control circuit $EC_2$. As shown in FIG. 4, this short wiring harness includes power supply wires $V^+$ and $V^-$ and a control signal wire $CTRL_2$. Preferably this short wiring harness is mounted on the shroud S that also supports the two fans $F_1$ and $F_2$. Since this harness communicating between adjacent motor electronic control circuits $EC_1$ and $EC_2$ is short, the harness can be readily shielded against EMF echoing through the engine compartment.

Referring now to FIG. 5, details of the electronic control circuits $EC_1$ and $EC_2$ can be discerned. Preferably, each control circuit includes a power stage and an ASIC (application specific integrated circuit). The power stage includes circuitry for providing power to the motor of the associated fan. Typically, the power stage can include power switches, such as MOSFETs and the like, designed to switch power to the motor windings. The ASIC can include commutation logic designed to ensure proper energization of the motor windings in the correct sequence. The ASIC can also incorporate protection functions, such as over-current and stall protection. Moreover, the ASIC can be configured to generate diagnostic information indicative of the state and operation of the electronic control circuit as well as the associated motor. Power stage and ASIC components of this type are known and can be readily devised by a person of ordinarily skill in the art of motor control.

In the illustrated embodiment, the electronic control circuit $EC_1$ for the first fan $F_1$ and its motor includes a power stage 12 and ASIC 14 that can be configured as described above. A diagnostic transistor 18 can convey diagnostic information generated by the ASIC. A power bus 30 provides power to the components 12 and 14, and is connected to a power supply $V^+$ and $V^-$, such as the vehicle battery. Optionally, the power bus 30 can be connected to an engine control unit (ECU) that is itself connected to the vehicle power supply.

In accordance with one feature of the present invention, the components of the controller $EC_1$ can be mounted on a common substrate or circuit board, or can be integrated into a common ASIC. Likewise, the power bus 30 can be integrated into the common substrate. The electronic controller $EC_2$ for the second fan $F_2$ and associated motor can be similarly configured. Specifically, in the preferred embodiment, the controller $EC_2$ can include a power stage 22, an ASIC 24, a diagnostic transistor 28 and a power bus 33 that are similar to the corresponding components in the other controller. Moreover, these components can also be mounted on a common substrate or configured as part of a common circuit board or ASIC.

In one feature of the invention, a uniform printed circuit board (PCB) or ASIC can be provided that is populated with at least the power stage 12, 22, ASIC 14, 24 and power bus 30, 33 components. The same PCB can then be used for every motor control circuit. Providing individual power components for each motor ensures thermal reliability of the power stage associated with each corresponding fan motor. In addition, the individual power components can ensure lower conducted and radiated RFI emissions from the system as a whole.

As shown in FIG. 5, the PCB for the first controller $EC_1$ includes an additional component, namely the microcontroller 16. This microcontroller 16 is connected to the power bus 30. On the other hand, the microcontroller is missing from the PCB for the second controller $EC_2$, as designated by the phantom lines 26. Nevertheless, the same PCB can be used for each motor controller, with only the requisite portions populated.

The microcontroller 16 of the first controller receives the control signal from the ECU along control wire 40. This control signal is typically a speed command corresponding to a desired airflow rate or volume. Thus, as the engine cooling requirements increase, the ECM may issue a speed command calling for faster operation of the fans $F_1$ and $F_2$.

Of course, the converse occurs as the engine cooling requirements decrease.

As illustrated in FIG. 5, the microcontroller 16 receives the speed signal 40 from the ECU and generates control signals for the commutation circuits (i.e., the ASICs 14 and 24) of each motor electronic controller $EC_1$ and $EC_2$. A signal bus communicates between the controllers to convey the appropriate control signals. These control signals, designated $PWM_1$ and $PWM_2$, ultimately direct the commutation of the fan motors as a function of the frequency of the PWM control signal. More specifically, in the preferred embodiment, the control signals are pulse width modulated signals (hence the designated PWM), at frequencies preferably ranging from 50 Hz to 40 kHz. The frequency of the PWM signal is directly proportional to the rotational speed of the motor and associated fan—i.e., lower PWM frequency means lower fan speed, while higher frequency translates to higher fan speed. The commutation logic within the ASICs 14 and 24 translate the frequency-based PWM signals to commutation rates for the respective motors.

As is known in the art, a pulse width modulated signal can correspond to a pre-determined duty cycle. In other words, the on and off times for the signal within a frequency-based period can be varied, while still retaining the frequency characteristics of the signal. In a preferred embodiment of the invention, as illustrated graphically in FIG. 6, the microcontroller 16 can take a low frequency PWM signal 40 from the ECU and translate it into high frequency PWM signals for the two motor controllers, each having different duty cycles. Thus, the signal $PWM_1$ for the first fan $F_1$ can have a shorter duty cycle than the signal $PWM_2$ for the second fan $F_2$.

The microcontroller 16 can be configured to produce signals $PWM_1$ and $PWM_2$ that are identical, with the same duty cycle. Optimally, the microcontroller 16 is operable to produce different duty cycle signals, as shown in FIG. 6. These different duty cycles would ultimately translate into different fan speeds between the two (or more) cooling fans $F_1$ and $F_2$. In other words, the different PWM signal on-off times, when fed to the commutation ASICs 14 and 24 yield different fan motor speeds through the power stated 12 and 22. These different fan speeds can be based on thermal profiles of the radiator, as sensed by the ECM and represented by the PWM signal 40 provided to the microcontroller 16 by the ECM.

The microcontroller 16 can include logic to read, evaluate and operate on the PWM signal 40 received from the ECU to produce the duty cycle signals $PWM_1$ and $PWM_2$. For instance, the microcontroller can apply a ratio to the input PWM signal 40 so that, for instance, the duty cycle of the signal $PWM_1$ is 50% and the signal $PWM_2$ is 75% of the incoming duty cycle. Alternatively, the incoming signal 40 can constitute a multiplexed signal with differing frequencies, and the microcontroller can be programmed to de-multiplex the signal and generate an appropriate PWM signal for each motor controller. It is within the understanding of the normally skilled artisan to produce a microcontroller and associated control logic operable to produce the different duty cycle signals for each fan motor controller.

A further feature of the invention is graphically depicted in FIG. 7. One common problem in automotive electronics and electrical systems is conducted RFI emissions. It is certainly desirable to minimize these conducted RFI emissions. Thus, in accordance with one embodiment of the invention, it is contemplated that the on-off times are staggered for the different PWM duty cycle signals. Thus, as shown in FIG. 7, the signal $PWM_1$ has an on time earlier in the frequency period than the signal $PWM_2$. Similarly, the off times of the two signals are offset relative to each other.

The present invention contemplates a single microcontroller that generates the duty cycle adjusted PWM signals for any number of motor controllers. Thus, only one single wiring bus is needed from the microcontroller to the ECU. All communications between the separate motor controllers pass through the microcontroller, such as microcontroller 16. These communications can include diagnostic information from the outlying motors, and can incorporate closed-loop speed control signals. In this latter case, the microcontroller can monitor current ripple for multiple motors and make appropriate adjustments to the corresponding PWM signal provided to that motor controller.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A system comprising:
    first and second fans driven by first and second electronically commutated motors, respectively,
    a commutation circuit for providing commutated power to each of the motors, each commutation circuit responsive to a modulated signal corresponding to each motor;
    a processor configured to receive a control signal from an external controller and operable to produce a modulated signal corresponding to each motor responsive to the control signal, wherein said processor is operable to produce each modulated signal at a common frequency; and
    a signal bus connecting said processor to said commutation circuit for each of the motors, said signal bus operable to transmit the modulated signal to each corresponding motor.

2. The system for controlling two or more commutated motors according to claim 1, wherein said processor is operable to stagger the on-off times for each modulated signal relative to each other.

3. The system for controlling two or more commutated motors according to claim 1, wherein the processor is operable to receive a speed control signal from the external controller and is operable to produce the modulated signal corresponding to each motor responsive to the speed control signal.

4. The system for controlling two or more commutated motors according to claim 1 further comprising a common shroud and wherein the first and second fans are mounted with the common shroud.

5. A system comprising:
    first and second fans driven by first and second electronically commutated motors, respectively,
    a commutation circuit for providing commutated power to each of the motors, each commutation circuit responsive to a modulated signal corresponding to each motor;
    a processor configured to receive a control signal from an external controller and operable to produce a modulated signal corresponding to each motor responsive to the control signal, wherein the processor is further operable to receive an ECU control signal from the external controller, the external controller comprising an engine control unit of a motor vehicle, and wherein the processor is operable to produce the modulated signal corresponding to each motor responsive to the ECU control signal; and a signal bus connecting said processor to said commutation circuit for each of the motors, said signal bus operable to transmit the modulated signal to each corresponding motor.

6. The system of claim 5 wherein said processor is operable to produce each modulated signal at a common frequency.

7. The system of claim 5 wherein said processor is operable to stagger the on-off times for each modulated signal relative to each other.

8. The system of claim 5 wherein the processor is operable to receive a speed control signal from the external controller and is operable to produce the modulated signal corresponding to each motor responsive to the speed control signal.

9. The system of claim 5 further comprising a common shroud and wherein the first and second fans are mounted with the common shroud.

10. The system of claim 5 further comprising a single wiring harness, the single wiring harness enclosing at least in part a first and second power supply wires and a control signal wire.

11. A system comprising:
first and second fans driven by first and second electronically commutated motors, respectively,
a commutation circuit for providing commutated power to each of the motors, each commutation circuit responsive to a modulated signal corresponding to each motor;

a processor configured to receive a control signal from an external controller and operable to produce a modulated signal corresponding to each motor responsive to the control signal;

a signal bus connecting said processor to said commutation circuit for each of the motors, said signal bus operable to transmit the modulated signal to each corresponding motor; and a single wiring harness, the single wiring harness enclosing at least in part a first and second power supply wires and a control signal wire.

12. The system of claim 11 wherein said processor is operable to produce each modulated signal at a common frequency.

13. The system of claim 11 wherein said processor is operable to stagger the on-off times for each modulated signal relative to each other.

14. The system of claim 11 wherein the processor is operable to receive a speed control signal from the external controller and is operable to produce the modulated signal corresponding to each motor responsive to the speed control signal.

15. The system of claim 11 further comprising a common shroud and wherein the first and second fans are mounted with the common shroud.

* * * * *

UNITED STATES PATENT AND TRADEMARK OFFICE
CERTIFICATE OF CORRECTION

PATENT NO. : 6,809,484 B2  Page 1 of 1
DATED : October 26, 2004
INVENTOR(S) : Makaran It is certified that error appears in the above-identified patent and that said Letters Patent is hereby corrected as shown below:

<u>Title page,</u>
Item [75], Inventor, should read as follows:
-- John E. Makaran, London (CA) --.

Signed and Sealed this

Fifteenth Day of November, 2005

JON W. DUDAS
*Director of the United States Patent and Trademark Office*